United States Patent [19]

Bartholomew

[11] Patent Number: 4,948,176

[45] Date of Patent: Aug. 14, 1990

[54] SWIVELABLE QUICK CONNECTOR ASSEMBLY

[75] Inventor: Donald D. Bartholomew, Marine City, Mich.

[73] Assignee: Proprietary Technology, Inc., Southfield, Mich.

[21] Appl. No.: 96,676

[22] Filed: Sep. 14, 1987

[51] Int. Cl.⁵ .............................................. F16L 35/00
[52] U.S. Cl. ...................................... 285/93; 285/319; 285/921; 29/453
[58] Field of Search .................. 285/93, 319, 320, 921, 285/924; 29/453

[56] References Cited

U.S. PATENT DOCUMENTS

| | | |
|---|---|---|
| 1,542,421 | 6/1925 | Strongson . |
| 2,123,889 | 7/1938 | Gleason . |
| 2,635,901 | 4/1953 | Osborn . |
| 2,935,338 | 5/1960 | Mills, Jr. . |
| 3,139,293 | 6/1964 | Franck . |
| 3,314,696 | 4/1967 | Ferguson et al. . |
| 3,405,957 | 10/1968 | Chakroff . |
| 3,450,424 | 6/1969 | Calisher . |
| 3,453,005 | 7/1969 | Foults . |
| 3,534,988 | 10/1970 | Lindsey . |
| 3,538,940 | 11/1970 | Graham . |
| 3,569,903 | 3/1971 | Brishka . |
| 3,574,359 | 4/1971 | Klein . |
| 3,584,902 | 6/1971 | Vyse . |
| 3,650,549 | 3/1972 | Pepper . |
| 3,698,742 | 10/1972 | Jones et al. . |
| 3,711,125 | 1/1973 | Dehar . |
| 3,718,350 | 2/1973 | Klein . |
| 3,724,882 | 4/1973 | Dehar . |
| 3,826,523 | 7/1974 | Eschbaugh . |
| 3,929,356 | 12/1975 | DeVincent et al. . |
| 3,929,357 | 12/1975 | DeVincent et al. . |
| 3,980,324 | 9/1976 | Bouteille et al. . |
| 4,004,883 | 2/1977 | Guest . |
| 4,009,896 | 3/1977 | Brewer . |
| 4,021,062 | 5/1977 | Mariaulle . |
| 4,059,288 | 11/1977 | Mohr . |
| 4,080,752 | 3/1978 | Burge . |
| 4,111,464 | 9/1978 | Asano et al. . |
| 4,123,089 | 10/1978 | Viero et al. . |
| 4,123,090 | 10/1978 | Kotsakis et al. . |
| 4,123,091 | 10/1978 | Cosentino et al. . |
| 4,128,264 | 12/1978 | Oldford . |
| 4,135,745 | 1/1979 | Dehar . |
| 4,214,586 | 7/1980 | Mericle . |
| 4,266,814 | 5/1981 | Gallagher . |
| 4,305,606 | 12/1981 | Legris . |
| 4,500,117 | 2/1985 | Ayers et al. . |
| 4,601,497 | 7/1986 | Bartholomew . |

FOREIGN PATENT DOCUMENTS 2307154 8/1974 Fed. Rep. of Germany .

OTHER PUBLICATIONS

IBM Technical Disclosure Bulletin, vol. 17, No. 7, Dec. 1974, Kish, 2 pages.

Primary Examiner—Dave W. Arola
Attorney, Agent, or Firm—Harness, Dickey & Pierce

[57] ABSTRACT

A fluid conveying connector assembly comprises separable plug and receptacle connector members adapted for axial mating engagement, lock means for locking the connector members together in mated relation, and indicating means operable with the lock means for visually indicating that the members are fully mated, the indicating means in response to the plug moving thereagainst into the receptacle being constrained by the lock means for axial movement between an exposed first position and a hidden second position from view in the receptacle, the lock means being operable to lock the connector members together only when the indicating means have reached the second position. Release means operate on the lock means for releasing the connector members.

23 Claims, 2 Drawing Sheets

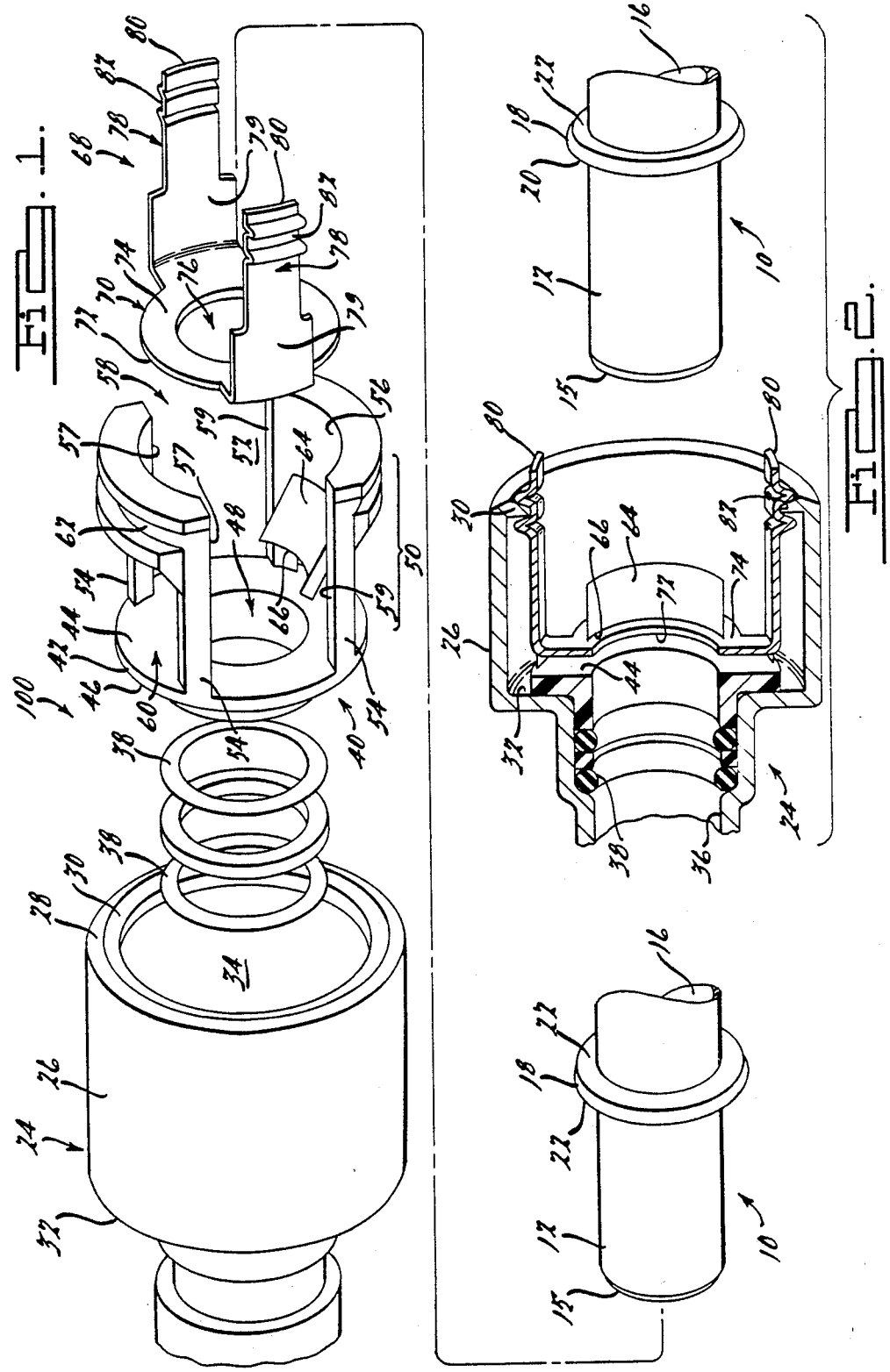

SWIVELABLE QUICK CONNECTOR ASSEMBLY

The present invention relates to a fluid connector assembly for providing a releasable, swivelable, quick connection.

In the automobile industry, as well as many other industries, a need always exists for low-cost, reliable, and easy-to-assemble components. This need is especially apparent with respect to providing a connection between fluid carrying conduits, such as a fuel or refrigeration line. In older threaded connectors substantial assembly time could be accumulated in screwing on a cap to a fitting and tightening the cap to provide for a fluid tight seal.

The connection of fluid carrying connectors is normally done as a hand operation and is thus operator sensitive. Where the connection is done on an assembly line and involves systems that must be defect free, a means of visually confirming that the connection is properly assembled becomes desirable.

Accordingly, it would be desirable to provide a fluid coupling that is quick and yet reliable and provides the assembler with an inexpensive arrangement for indicating that a full mate between connector members has been accomplished. Also, such a connection should be easily releasable.

The present invention provides a fluid tight seal in a fluid conveying connector assembly comprising separable first and second connector members adapted for axial mating engagement one including an annular flange, lock means for locking the connector members together, and indicating means movable between a first and a second position in response to the one connector member moving axially toward the other connector member for visually indicating that the members are fully mated, the lock means being operable to lock the connector members together only when the indicating means have reached the second position.

The lock means include a pair of angularly spaced radially deflectable retention beams each extending from an annular collar to define an axially slotted tubular retainer cage demountably fixed against axial displacement within the one connector, each beam having a deflectable jaw converging radially inward towards the cage axis with each jaw being adapted to deflect radially and to seat against the annular flange on the other connector when inserted through the jaw whereby to prevent unwanted axial withdrawal.

The indicating means include an actuating ring member adapted to be driven into the one connector by the other connector during mating and a pair of axial indicator beams each extending from the ring member, each indicator beam being constrained within one axial slot of the tubular retainer and having an end portion exposed before mating but driven into the one connector with the actuating member and retracted from sight after mating indicative that a locked relation has been achieved.

Releasability of the assembly is normally achieved by flexing the retention beams radially inward or the jaws radially outward. Should the indicator beam completely fill its axial slot, then the retention beam would not deflect radially inward to allow release of the lock means from the one connector. In this regard, coaxial insertion of a tool about the outer periphery of the other connector will deflect the jaws whereby the connectors are separated, this being accomplished with the indicating means being in place. Alternatively, the indicator beams may be configured so that they may be first deflected inward to clear the space required for the inward deflection for the retention beams, and the plug connector demounted without the tool.

Such a connector assembly advantageously allows full mate indication in assembly operations, provides releasability of the mating connector either by removal of the retainer with indicator and by rearward inward insertion of a tool to deflect the jaws from locking against the annular flange. Further the connector members would be intermateable at any angular position relative to one another both during and after mating to obviate strains on the interconnection that might come from a rigidly restrained fluid coupling.

The foregoing and other objects will become more apparent when viewed in light of the accompanying drawings and following detailed description wherein:

FIG. 1 is an exploded view of a connector assembly according to the present invention.

FIG. 2 is in perspective and in section showing partial assembly of the connector assembly shown in FIG. 1.

Figure 3:
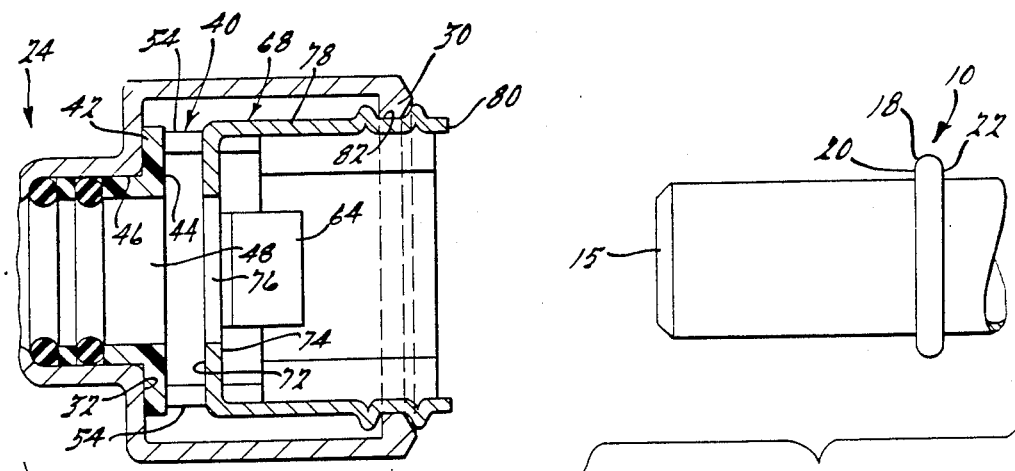
FIG. 3 is a side view in section of the partial assembly shown in FIG. 2.

Turning now to the drawings, FIGS. 1 and 2 show a fluid conveying connector assembly 100 comprising a pair of separable, generally cylindrical, plug and receptacle fluid connector members 10, 24 each adapted for mating engagement whereby to convey fluid therebetween, the connector members being movable along an axis towards one another between an uncoupled relationship and a coupled relationship. As will be described herein the coupled relationship provides a fluid tight coupling which is swivelable and yet releasable if desired.

The plug connector member 10 has a cylindrical shell 12 having a somewhat rounded end face 15, an axial bore 16 to convey fluid extending coaxially inward from the end face, a cylindrical outer periphery including an outwardly extending annular flange 18 formed at a predetermined distance from the end face, the flange defining a forwardly and rearwardly facing shoulder 20, 22.

The receptacle connector 24 has a cylindrical shell 26 having an end face 28 defining a first end, an inward radial flange 30 adjacent the first end, and a stepped bore to convey fluid extending coaxially inward from its end face, the bore defining a receptacle 34 sized to receive the plug connector when inserted therein and including a second end 32. The bore at 36 is substantially the same diameter as the outside diameter of shell 12 which is inserted into the bore at 36. After mating of connector members 10, 24 seals 38 adjacent the second end 32 provide a bearing surface to maintain connector member 10 centrally located in the bore and a seal between the plug connector and receptacle connector. A tubular retainer member 40 is demountably coupled to the inward radial flange 30 so as to be axially fixed interiorly of the receptacle to prevent the unwanted disconnection of the plug connector from the receptacle. An indicator member 68 is engageable by the plug connector and mounted to move axially from a visible first position exterior of the receptacle and to a second position inward of the receptacle and retracted from view, the second position representing the fully coupled relationship.

The retainer member 40 includes an annular collar 42 or ring portion and a pair of cantilever retention beams 50 each beam extending coaxially from the collar to define a tubular cage having an interior annular chamber 52. The annular collar has a central bore 48 extending between top and bottom surfaces 44, 46 thereof with the bottom surface being configured to seat against the second end 32 of the receptacle. The retention beams 50 are formed by a pair of beam legs 54 and an arcuate body 56, the retention beams being generally equiangularly spaced and the arcuate body defining a radially deflectable end portion. An angular axially extending slot 58 separates the longitudinal edges 57, 59 of adjacent retention beams and an angular axially extending opening 60 is disposed between the top face 44 of the collar, the arcuate body 56 and the beam legs forming each retention beam. The arcuate body 56 has an outwardly opening annular groove 62 configured to engage the inward radial flange 30 whereby to demountably position the retainer in the receptacle. Radially deflectable arcuate jaw members 64 slant at an acute angle radially inwardly from the opening of each arcuate body and terminate in a free end 66 inwardly of the annular chamber of the cage, the free ends of the jaws forming a retention cone and being deflectable radially outward whereby to allow the annular flange 18 to pass whereupon the jaws will seat against the rearward shoulder 22 and prevent unwanted axial withdrawal of the plug connector member from the receptacle connector member.

The indicator member 68 includes an annular ring 70 which defines an actuating member and a pair of axially extending deflectable indicator beams 78, each beam including adjacent its deflectable end 80 an outwardly opening annular channel 82 to engage the inward radial flange 30 on the receptacle. The annular ring has a top and bottom face 74, 72 provided with a central opening 76 to pass the forward end 12 of the plug connector member whereupon the forward shoulder 20 of the annular flange 18 will engage the top face 74 of the ring to drive it interiorly of the receptacle 34 whereupon the indicator beams 78 retreat from a first position exposed exteriorly of the receptacle to a second position interiorly of the receptacle and retracted from view. Each indicator beam is angularly enlarged at 79 adjacent to its securement to the ring and sized to fit between respective edges 57, 59 of a retainer slot 58. As shown in FIG. 2 each annular channel 82 is engaging the inward radial flange 30 and the free end 80 of each indicator beam is exposed. Simultaneously upon the annular ring 70 bottoming interiorly of the receptacle and interiorly of the retainer, the bottom face 72 seats against the top surface 44 of the annular collar, and the plug connector member reaches the second position whereupon the jaw members 64 seatingly snap behind the annular flange area 22.

The seals 38 are comprised of an elastomeric material and may have a generally cylindrical cross-section, each seal being disposed in the second end of the receptacle so as to provide a 360° seal first annularly between the inner wall of the receptacle connector member and the outer periphery of the plug receptacle connector and second axially between the receptacle connector at bore 36 and the annular collar on the retainer member. In accord with this invention the seals would be comprised of a tough material resistant to attack by corrosive fluids and yet resilient enough to compress and provide a fluid tight sealing.

Figure 4:
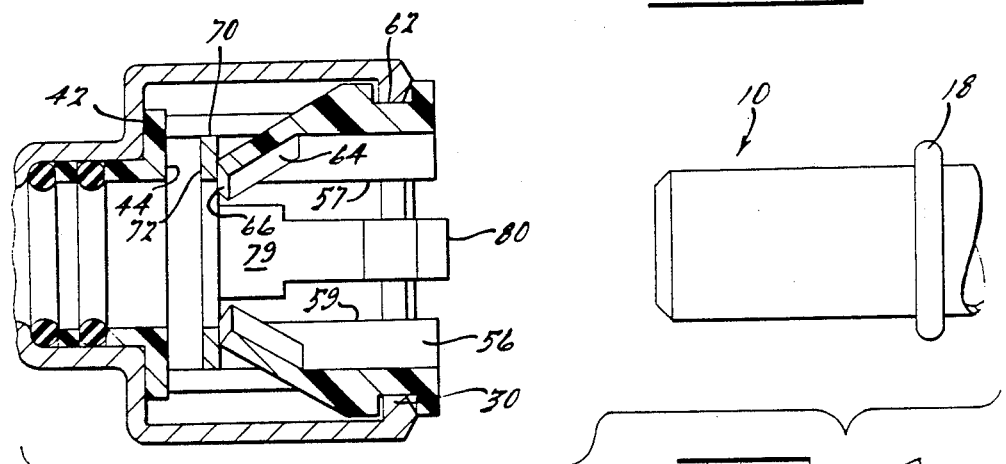
FIG. 4 is a side view in section of the assembly shown in FIG. 3 but rotated 90°.
Figure 5:
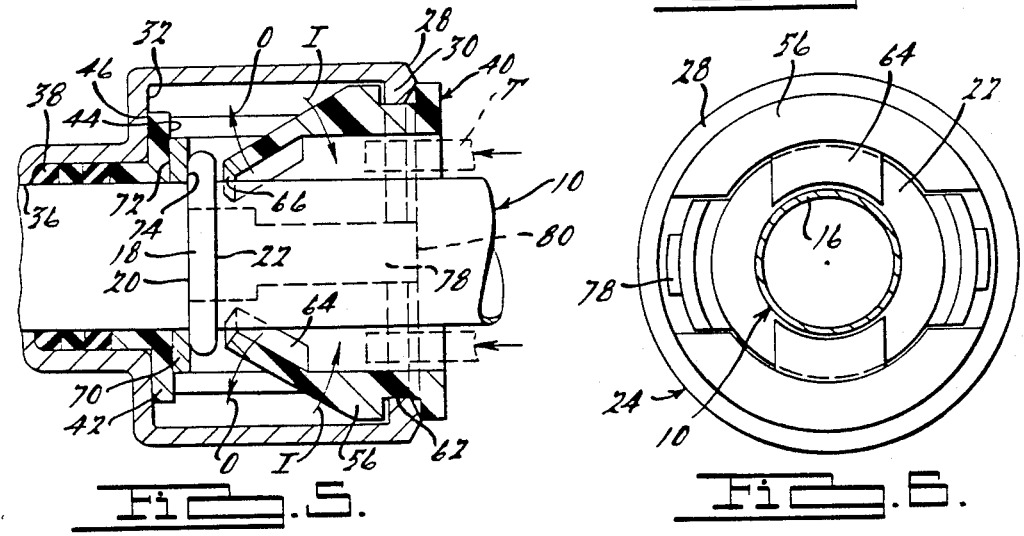
FIG. 5 is a side view in section, such as shown in FIG. 4, showing the fully mated relationship.

FIGS. 3, 4 and 5 show the progressive entry of the plug connector member 10 into the receptacle. In FIG. 3 the retainer 40 has been inserted into the receptacle 34 such that its bottom surface 46 is seated against the second end of the receptacle and biasing against one of the elastomeric seals 38, and the indicator member 68 is positioned in the annular chamber of the retainer such that the annular channels 82 engage the inward radial flange 30 in the receptacle connector and end portions of the indicator beams 78 extend exteriorly of the receptacle to indicate an unmated condition exists. FIG. 4 is the connector assembly of FIG. 3 rotated 90° to show the retainer member having its arcuate body 56 positioning the annular grooves 62 so as to demountably engage the inward radial flange on the receptacle. The enlarged portions 79 of the indicator beams 78 are disposed in the slots 58 between edges 57, 59 of the retention beams 50.

FIG. 5 shows the completed fluid coupling wherein the forward shoulder 20 around the annular flange 18 of the plug connector member has engaged bottom face 74 and forced the annular ring 70 of the indicator member 68 axially inwardly of the receptacle and against the top surface 44 of retainer collar 40, and the free ends 66 of jaws 64 seating behind the rearward shoulder 22 to prevent outward axial movement of the plug connector. Shown in phantom (i.e., the dotted lines) are the indicator beams 78 which have been driven from view axially inward of the receptacle. During axial movement between the first and second positions the enlarged portion 79 of the indicator member 68 received within the axial slot of the retainer member constrains the indicator member for axial movement inwardly of the receptacle.

Figure 6:
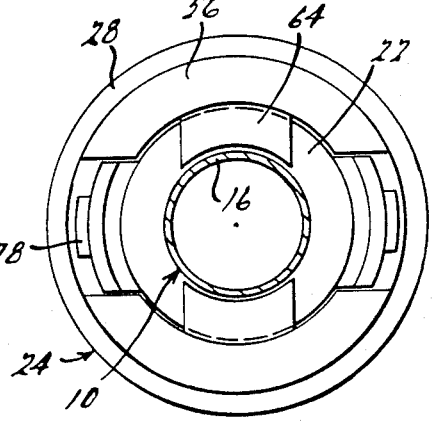
FIG. 6 is an end view partially in section of the mated assembly shown in FIG. 5.

FIG. 6 shows an end view of the coupled connector assembly.

Once the connector members 10, 24 are coupled in a quick axial movement by the user, a fluid tight connection is provided. During and following the fluid coupling connection rotation of the plug connector relative to the receptacle connector is permitted.

To remove the plug connector member from the receptacle a tool (shown in phantom and indicated as "T"), such as could be represented by one or more cylindrical sleeve portions, is coaxially inserted into the receptacle between the interior wall of the retainer member 40 and the outer periphery of the plug connector 10 until the sleeve portions reach the rearwardly facing shoulder 22 of the annular flange 18 whereupon the jaw members 62 are deflected radially outwardly relative to the central axis, shown by the arrow labeled as "O", allowing the plug connector member to be removed and axially retracted from the receptacle. Further, if the retention beams 50 are deflected radially inwardly towards the central axis indicated by the arrows labeled "I", the outwardly opening grooves 62 disengage from the inward radial flange of the receptacle connector member thereby allowing removal of the retainer. In this instance retainer member 40, indicator member 68 and plug member 10 are removed as a group and may be reinserted into coupler member 24 as a group (i.e., collectively or as a unitized assembly).

If indicator beams 78 are dimensioned so as to be sufficiently wide to allow inward movement "I" of beams 50 during original insertion of retainer member 40 and indicator member 68 prior to coupling of members 10, 24, the geometry of the manual release movement to accomplish movement "I" as previously explained prevents sufficient movement to accomplish movement "I". By this means the coupling may be manufactured so as to always require a removal tool "T" to decouple connector member 10, 24.

I claim:

1. A fluid conveying connector assembly comprising separable first and second connector members adapted for axial mating engagement, characterized by lock means for locking the connector members together in mated relation, indicating means for indicating said members are fully mated, and an annular flange on one of said first or second connector members to drive against the indicating means, said lock means being associated with at least one of said first or second connector members and operating to constrain said indicating means for axial movement between a first position and a second position in response to one of said first and second connector members moving axially toward the other of said first or second axial connector members, said first and second positions representing, respectively, the unmated and mated positions of the connector members, and said lock means being operable to lock the connector members together only when the indicating means has reached said second position.

2. The connector assembly as recited in claim 1 including release means operable with said lock means for releasing said connector members from mated relation.

3. The connector assembly as recited in claim 2 wherein said release means comprise said lock means including a pair of axially extending beams being connectable to one of said first or second connector members and resiliently deflectable radially inwards toward one another whereby to disengage from said first or second connector members.

4. The connector assembly as recited in claim 1 wherein each said connector member comprises a tubular conduit, one defining a receptacle open at one end and having an axial bore sized to receive the forward end portion of the other conduit inserted therein, said receptacle including an inward radial flange and a transverse end wall, and said lock means comprises a tubular retainer in said receptacle and including an annular collar and a retention beam extending coaxially from the collar and terminating in an annular groove for engaging said radial flange wuereby to rigidly fix said retainer in said receptacle, said retention beam inwardly radially deflectable relative to said flange to disengage from the radial flange whereby the retainer and the other conduit are released from the receptacle.

5. The connector assembly as recited in claim 4 wherein two retention beams extend from said collar, each said beam being diametrically opposed and said beams defining a pair of axial slots operating to constrain the indicating means to axial movement.

6. The connector assembly as recited in claim 5 wherein said lock means comprises a pair of jaw members each converging radially inward from one respective retention beam to a free end to define with their free ends a constricted opening, each free end being adapted to seat against the annular flange on the other conduit.

7. The connector assembly as recited in claim 1 wherein said one connector member includes a receptacle sized to receive said other connector and an inward radial flange, said indicator means comprises an annular ring adapted to be driven by said annular flange and having a central opening to pass the forward end portion of said other connector and a pair of elongated indicator beams each extending coaxially from said ring and terminating in an end portion that is disposed exteriorly of the receptacle when in the first position and interiorly of the receptacle when in the second position, each indicator beam including an outwardly opening channel to engage the inward radial flange on said one connector member to detain the indicator means at the first position, and said lock means includes a pair of jaws, the annular flange acting to drive the annular ring axially rearward into the second position whereupon the jaw members seat against the annular flange to lock the connector members together.

8. A fluid conveying connector assembly comprising a first and a second connector member each movable towards one another and between a first and second position for mating engagement, characterized by a retainer captivated in one of said first or second connector members, an indicator separated from said retainer and movable from view upon mating engagement by said other of said first or second connector member engaging said indicator, and lock means operable between said retainer and said other first or second connector member for locking the members together only when the indicator is in said second position.

9. The connector assembly as recited in claim 8 wherein said indicator includes an indicator beam which extends from and retracts within said first or second connector member upon movement between said positions and said retainer is axially slotted with said indicator beam being constrained within one slot.

10. The connector assembly as recited in claim 8 wherein said lock means comprises an inwardly directed jaw which seats behind an annular flange on the other of said first or second connector member.

11. The connector assembly as recited in claim 8 wherein said first or second connector member includes a receptacle having a pair of coaxially spaced interior end walls and said retainer comprises an annular cage demountably captivated between said end walls and axially slotted to define a pair of retention beams, each beam having a free end abutting one of said pair of interior end walls, radially flexing the beams disengaging the free ends whereby the retainer may be removed.

12. A separable fluid connection comprising cylindrical first and second conduits connectable along a common axis in fluid tight relationship, and releasable means for connecting the conduits together, said releasable means associated with one of said first or second conduits, characterized by indicating means for providing a visual indication that the connection has been completed, said indicating means being actuated by one conduit during connection with the other conduit whereby to move from a first position exterior of the other conduit and a second position retracted from view interior of the other conduit and lock means operable between said releasable means and said other first or second conduit for locking the conduits together only when the indicating means is in said second position and said indicating means separate from said lock and releasable means.

13. A fluid connector assembly comprising tubular first and second connectable conduits and means for connecting the conduits together into a fluid tight relation to convey fluid, said connecting means associated with one of said first or second conduits, characterized by said first conduit defining a receptacle extending inwardly from a front face thereof sized to receive the second conduit, and an actuating member being disposed in said receptacle and having a beam exposed at the front face, said actuating member being axially movably mounted in said receptacle and including means adapted to be driven interiorly of the receptacle by said second conduit during mating of the conduits, movement of said actuating member retracting the beam into the receptacle and from view whereby to indicate the fully mated relation has been achieved and lock means operable between said connecting means and said other first or second conduit for locking the conduits together only when the actuating member is in said fully mated relation and said actuating means separate from said lock and connecting means.

14. The fluid connector assembly as recited in claim 13 and further characterized by said lock means being releasably disposed in said receptacle for locking the conduits together in said fully mated relation, said lock means including an axially slotted retainer including a transverse end wall, each slot extending axially inward from adjacent said end face for receiving one said beam and said transverse end wall being adjacent the inward extension of each said slot to define a limit on inward insertion of said actuating member.

15. The fluid connector assembly as recited in claim 14 wherein said lock means comprises a cylindrical cage releasably insertable into said receptacle, said cylindrical cage including means for fixing said cage against axial movement therewithin, said cage including a pair of angularly separated, arcuate, deflectable retention beams each extending coaxially at a location radially outward from the cage axis with the angular separation between each of the retention beams defining a pair of axial slots each sized to receive one said indicator beam.

16. A first conduit having an annular shoulder and adapted to mate with a second conduit having a receptacle, characterized by means adapted for coupling said first and second conduits, said coupling means associated with one of said first or second conduits, an axially retractable indicator element mounted in said receptacle, said indicator element having an actuator member acted on by said shoulder when said first conduit moves interiorly of said receptacle from a first position and to a second position and an indicator beam exposed in said first position and hidden from view in said second position and lock means operable between said coupling means and other first or second conduit for locking the conduits together only when the indicator element is in said second position and said indicator element separate from said lock and coupling means.

17. A mating indicator for a fluid connector assembly wherein a first conduit is received in a receptacle defined by a second conduit, said conduits including means for providing a fluid tight connection, characterized by an annular collar having a central opening extending between top and bottom surfaces thereof and an elongated beam extending from said collar and having an end portion adapted to extend outwardly of said receptacle prior to insertion of said first conduit in said receptacle, said opening being sized to pass a mating forward end portion of said first conduit and said top surface being acted on by the first conduit whereby to drive the collar inwardly into the receptacle and the outwardly disposed end portion of said beam being driven interiorly from view into the receptacle when the collar is acted on.

18. A fluid connector assembly of the type including a pair of cylindrical connector members each having an axial bore and movable along an axis towards one another and between an uncoupled relationship and a coupled relationship wherein one connector member has a portion thereof interiorly of the other connector member whereby fluid can be conveyed through the bores, retainer means for releasably retaining said one connector member in said other connector member, and indicating means for indicating that the connector members are in the coupled relationship, characterized by said retainer means being interiorly of the other connector member for locking the one connector member from axial movement therewithin and including an axially extending beam member having one end thereof fixed at a location radially outward from said axis so as to be in circumposing relation outwardly from and about said one connector member and a free end deflectable inwardly and outwardly towards the axis with deflection operating to release the retainer means and allow removal of the one connector member, and said indicating means operated on by said one connector member during coupling insertion into said other connector member and mounted to the other connector member for axial movement between a visible first position exteriorly of the other connector member and a second position interiorly of and retracted from view and representing the coupled relationship.

19. The fluid connector assembly as recited in claim 18 wherein said one connector member includes an annular flange defining a forward and rearward shoulder, said forward shoulder engaging the indicating means and said rearward shoulder engaging the free end.

20. The fluid connector assembly as recited in claim 19 wherein said retainer means includes a cylindrical cage defining an annular chamber fixed against axial movement and said axially extending beam is fixed to the cage at one end and extends inwardly therefrom at an acute angle to the axis and to said free end to engage the rearward shoulder of the annular flange.

21. The fluid connector assembly as recited in claim 18 wherein said other connector member includes an inward radial flange and an interior end wall transverse to said axis, and retaining means includes a flat annular collar having a central opening to pass the one connector member and an outer rim, and a pair of axially extending deflectable retention beams each having an annular channel to releasably engage said flange, said beams being coaxially fixed to the collar adjacent to the rim and each said channel being deflectable radially inwardly toward the axis whereby to release the retainer means.

22. A method for coupling two conduits and providing an indication that the coupling is properly made, one conduit having an interior wall defining an inwardly extending receptacle for receiving the other conduit inserted therein, and the other conduit having an outward annular flange, the steps comprising:
providing adjacent to the interior wall of the one conduit, means defining a slot extending axially, means for connecting to the outward annular flange of the other conduit, and a jaw converging radially inward into the receptacle,
mounting an indicator means in the receptacle for axial displacement from a first position indicating the coupling is not complete and to a second position, defined by said jaw, indicating the coupling is complete, said mounting positioning an actuator member interiorly of said receptable for engagement by the flange during insertion of said other conduit into said one conduit and an indicator beam partially exteriorly of the receptacle and for operable movement in the slot, and inserting the other conduit into the receptacle such that the flange engages and drives said actuator member axially rearward and within the receptacle, said inserting driving the indicator beam to the second position whereupon the jaw seats behind the flange and the first and second conduits are coupled in a mated relation.

23. The method as recited in claim 22 including the steps of demountably captivating a retention cage including said jaw and said axial slot in said receptacle, said captivating preventing axial movement of said cage.

* * * * *

UNITED STATES PATENT AND TRADEMARK OFFICE
CERTIFICATE OF CORRECTION

PATENT NO. : 4,948,176

DATED : August 14, 1990

INVENTOR(S) : Donald D. Bartholomew

It is certified that error appears in the above-identified patent and that said Letters Patent is hereby corrected as shown below:

Col. 1, Line 48, "jaw" should be --jaws--;

Col. 5, Line 20, "and" should be --or--;

Col. 5, Line 33, after "beams", insert --each--;

Col. 5, Line 48, "wuereby" should be --whereby--;

Col. 5, Line 49, after "beam", insert --being--;

Col. 6, Line 49, after "axis", insert --including means for providing a--;

Col. 6, Line 49, delete "in" after axis;

Col. 8, Line 15, "fized" should be --fixed--.

Signed and Sealed this

Twenty-eighth Day of April, 1992

*Attest:*

HARRY F. MANBECK, JR.

*Attesting Officer*     *Commissioner of Patents and Trademarks*